United States Patent [19]

Uebelhart

[11] Patent Number: 4,635,492
[45] Date of Patent: Jan. 13, 1987

[54] TELESCOPIC ASSEMBLY

[75] Inventor: Hugo Uebelhart, Liestal, Switzerland

[73] Assignee: Magnetic Elektromotoren A.G. Liestal, Liestal, Switzerland

[21] Appl. No.: 702,617

[22] Filed: Feb. 19, 1985

[30] Foreign Application Priority Data

Feb. 20, 1984 [CH] Switzerland ............... 814/84

[51] Int. Cl.[4] ............. F16H 25/20; F16M 11/00
[52] U.S. Cl. ............................. 74/89.15; 248/405
[58] Field of Search ............. 74/89.15, 424.8 R; 308/3 R; 248/405, 406, 406.1, 406.2, 162.1; 297/347, 348

[56] References Cited

U.S. PATENT DOCUMENTS

| | | | |
|---|---|---|---|
| 1,242,109 | 10/1917 | Koken | 248/405 |
| 1,242,110 | 10/1917 | Koken | 248/405 |
| 1,279,346 | 9/1918 | Hultgren et al. | 248/405 |
| 1,708,450 | 4/1929 | May | 74/424.8 R |
| 1,989,611 | 1/1935 | Dall et al. | 74/424.8 R |
| 3,161,074 | 12/1964 | Korthaus et al. | 74/424.8 R |
| 3,442,593 | 5/1969 | Marcovecchio | 74/89.15 |
| 3,537,762 | 11/1970 | Lodige | 308/3 R |
| 4,089,566 | 5/1978 | Schmidt | 308/3 R |
| 4,337,868 | 7/1982 | Gattu | 74/89.15 |
| 4,493,469 | 1/1985 | Holobaugh | 248/406.1 |
| 4,517,853 | 5/1985 | Tani et al. | 74/89.15 |

FOREIGN PATENT DOCUMENTS 303985  3/1955  Switzerland ............ 297/348

Primary Examiner—Lawrence Staab
Attorney, Agent, or Firm—Robert R. Jackson

[57] ABSTRACT

A telescopic assembly is provided, which includes an inner tube, in which a motor having a hollow output shaft and a spindle secured thereto connects an outer tube through a drive tube.

15 Claims, 4 Drawing Figures

4,635,492

TELESCOPIC ASSEMBLY

BACKGROUND OF THE INVENTION

1. Field of the Invention

The present invention relates to a telescopic assembly.

2. Description of the Prior Art

Telescopic assemblies are well-known mechanical devices. Such devices have an inner tube, a motive power source affixed within the inner tube, a drive means connected to the motive power source and an outer tube movably disposed onto said inner tube, said drive means are in engagement with the outer tube, whereby rotation of the drive means effects reciprocal displacement of the telescopic assembly.

However, these devices have a complex structure due to the chosen art of the transfer of force caused by the drive means.

SUMMARY OF THE INVENTION

It is a principal object of the invention to provide a new and improved motor powered telescopic assembly that is more compact than prior art assembly of a comparable power capacity and length of powered thrust.

It is another object of the invention to provide a new and improved motor powered telescopic assembly useful for legs of a furniture in order to adjust the level.

It is yet another object of the invention to provide a new and improved motor powered telescopic assembly having a plunger which is also reciprocable for eccentric dead load.

It is still another object of the invention to provide a new and improved motor powered telescopic assembly suitable for use in any tilting position due to the fact that the position of the electrical connections and the control unit is selectable.

In keeping with these objects the inventive telescopic assembly comprises a motor having a hollow output shaft, a spindle connected to the output shaft and extending therethrough, and a drive tube screwed onto the spindle. The motor as well as the associated control means are disposed within an inner tube. An outer tube is movably disposed onto the inner tube and connected to the drive spindle.

BRIEF DESCRIPTION OF THE DRAWINGS

The present invention will be more fully understood by reference to the following detailed description thereof when read in conjunction with the drawings, and wherein.

DESCRIPTION OF THE PREFERRED EMBODIMENT

Figure 1:
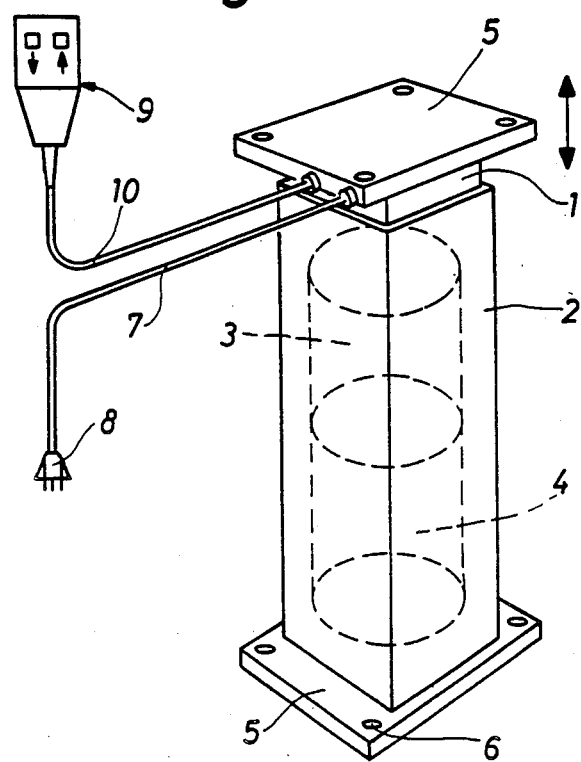
FIG. 1 shows a perspective view of an embodiment of the telescopic assembly.

As shown in FIG. 1 the telescopic assembly comprises substantially an inner tube 1 and an outer tube 2 as well as drive means 3 and control means 4 disposed within said inner tube and indicated by dashes. A mounting plate 5 having holes 6 are provided at one end of the inner tube 1 and the outer tube 2, which mounting plate could be adapted to each use. A connecting line 7 having a plug 8 is provided in order to connect said telescopic assembly to an external power source. Furthermore the telescopic assembly includes a control unit 9 connected with said control means 4 via a line 10. This control unit 9 is intended for controlling the telescopic assembly. The connecting line 7 and line 10 are led from said mounting plate 5 fixed to said inner tube. Therefore no flexible connecting members are necessary and the wiring can be accomplished in a fixed manner. In the embodiment shown in FIG. 1 the telescopic assembly contains an overhead inner tube 1, and the drive means 3 and the control means 4 are movable with said inner tube 1.

Figure 2:
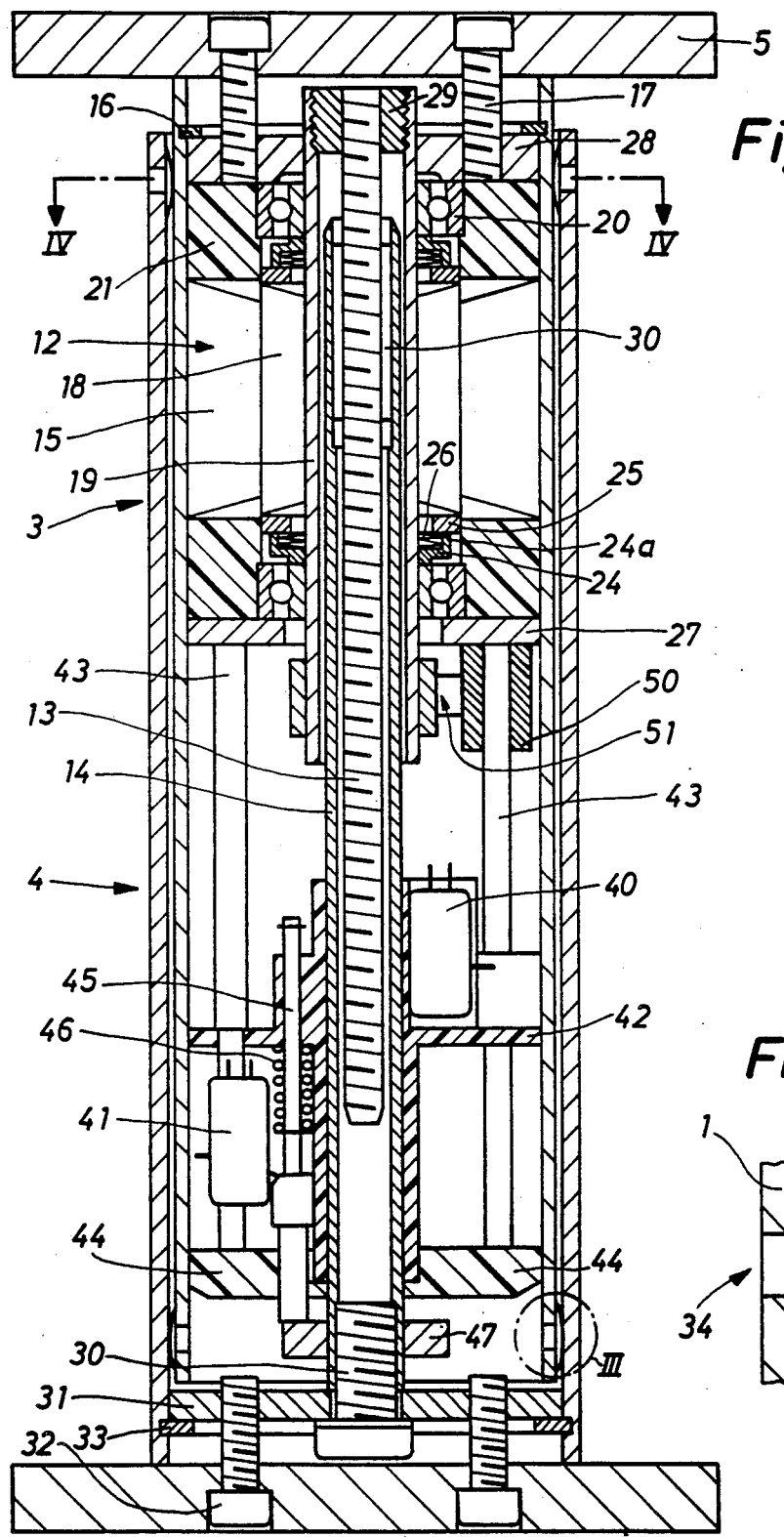
FIG. 2 shows an axial section of said telescopic assembly.

As shown in FIG. 2 the drive means is a thrust and draw drive and includes a motor 12 having a hollow shaft, a spindle 13 and a drive tube 14. The motor includes a stator 15 affixed to said inner tube 1. A Seeger-ring 16 is provided within the inner tube 1. This Seeger-ring serves as stop for the stator. The stator is pulled against the stop 16 by means of two bolts 17. Thus the stator is fixed within the inner tube 1. As already mentioned the rotor 18 includes a hollow output shaft 19. The rotor 18 is supported by means of ball bearings 20 within the stator 15. The coil ends 21 of the stator winding are fused in plastic material. The fused coil end 21 has a portion on the inner side, in which portion the outer ring 22 of the ball bearing 20 is fitted.

Annular members 24 are disposed between the inner ring 23 of the ball bearing 20 and the rotor 18. With a first surface 24a these members 24 abut against a disk 25 fixed to the rotor 18. With a second surface 24b these members 24 abut against the inner ring 23 of the ball bearing. The members 24 include a recess on the side face toward the rotor 18. Annular centering elements 26 are provided within said recess. These elements 26 rest on said hollow output shaft 19. These centering elements 26 are provided for centering of the members 24 surrounding the hollow output shaft 19 with a clearance. The motor 12 is closed by a plate 27 coaxially disposed regarding the hollow output shaft 19 The motor 12 is separated from the control means 4 by this plate 27. On the other side the motor 12 is also closed by a plate 28, into which the bolts 17 for fixing the motor 12 are screwed.

As shown in FIG. 2 the motor 12 is disposed in the region of the end of the tube closed by the mounting plate 5. The spindle 13 extends through the hollow output shaft 19.

The spindle 14 is secured to the hollow output shaft 19 by means of a connecting piece 29 such that the hollow output shaft 19 and the spindle 14 rotate together.

A nut 30 is secured to the drive tube 14 at one end thereof. The drive tube 14 is screwed onto the spindle 13. The other end of the drive tube 14 is fixed to a plate 31 by means of bolts 32. These bolts 32 are provided in the mounting plate 5 closing the outer tube 2.

The inner and outer tube 1, 2 have a rectangular cross section. Thus twisting of the tube to each other can be prevented. In order to ensure a proper guiding of the tube 1, 2 guide members 34 are disposed in the region of the open ends of the inner and outer tube 1, 2.

Figure 4:
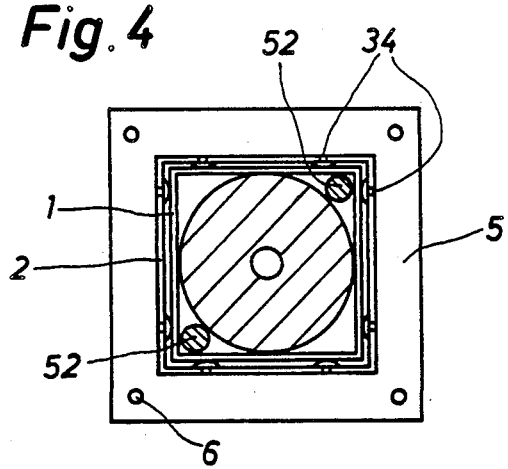
FIG. 4 shows a section along line IV—IV in FIG. 2.
Figure 3:
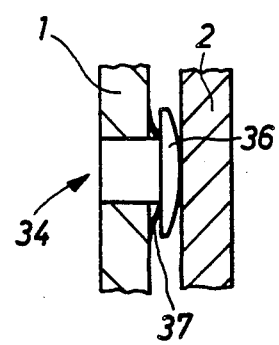
FIG. 3 shows a detailed view of a guide member.

The guide member 34 is shown in FIG. 3. The guide member 34 has a pin 35 and a button-like portion 36 having a convex surface. The pin 35 is disposed in the wall of the inner tube 1 and the button-like portion 36 abuts with its convex surface onto the inner side of the wall of the outer tube if the guide member 34 is mounted in the inner tube 1 (FIG. 3). The pin 35 is disposed in the wall of the outer tube 2 and the button-like portion 36 abuts with its convex surface against the outer side of the inner tube 1. A spring washer is disposed between the wall and the button-like portion 36 to bias the guide member 34 to the wall of the other tube 1 or 2. As shown in FIG. 4 two guide members 36 are provided for each wall of the inner and outer tube 1, 2, respectively. The guide members 34 are disposed in the region of a corner of the inner and outer tube 1, 2, respectively, whereby a proper guiding in lumps is achieved. This guiding in lumps has the advantage that very little friction occurs. The guide members 34 consist of plastic e.g. Teflon ®. This guiding allows a satisfactory operation of the motor 12, also if eccentrically loaded because the possible swing of the drive tube lies within permissible limits.

A breaking means 51 is provided in order to prevent an adjustment of the telescopic assembly when the motor 12 is disconnected from the power source. This breaking means 51 is disposed on the hollow output shaft 19.

The breaking means includes a sleeve disposed on the hollow output shaft. A toothed rim and a spring interacting therewith are disposed on the sleeve. The breaking means further includes a pawl pivotably mounted on one support rod 43. A filler of felt is disposed between the sleeve and the hollow output shaft.

If the breaking means operates, the toothed rim is interlocked by the pawl. Thus the spring is tensioned whereby the sleeve is compressed and therefore urged against the hollow output sleeve. Thereby friction is produced between the sleeve and the hollow output shaft, which friction causes the stop of the hollow output shaft.

The profile of the inner and outer tube is preferably of aluminium and can be adapted for the respective application. The square profile (FIG. 4) performs a twist-free guiding with optimum use of room. Further means can be disposed within the space determined by the shell of the motor 12 and the corner of the inner tube 1 (FIG. 4). As indicated in FIG. 4 a gas-pressure means 52 is disposed at two opposite corners. These means 52 extend between the ends of the inner and outer tube and are provided to take up a part of the dead load. Thus the lifting capacity of the telescopic assembly is increased when the same motor 12 is used. This is advantageous if the telescopic assembly forms the foot of furniture, the movable part of which has a relatively high and constant load.

Further sensors for a measuring device, e.g. a linear potentiometer or an optical detecting device of known art, can be disposed within this region of corner. This measuring arrangement can be adapted to reflect the relative position of inner tube 1 and outer tube 2, and can be connected with a means (e.g., control unit 9) for controlling the motive power source.

For a rotatable telescopic assembly used for chairs the inner and outer tube 1, 2 has circular cross sections. The motor 12 is coaxially disposed regarding the axle of profile. Thus the drive tube 14 can rotate on the spindle 13 if the inner and outer tube 1, 2 are rotated to each other. This rotation causes a little adjustment of the inner and outer tube. Due to the small pitch of the spindle 13 this adjustment is of no consequence.

The control means 4 includes two limit switches 40, 41, a support 42 for the limit switches, at least two support rods 43 and an end plate 44. At one end the support rods 43 are secured in the plate 27 and at the other end the support rods 43 are secured in the end plate 44. The support 42 is secured on the support rods 43.

The limit switch 40 disconnects the motor 12 from the power source when the telescopic assembly is extended. The limit switch 41 disconnects the motor 12 from the power source when the telescopic assembly is retracted. The operating lever of the limit switch 40 abuts to the shell of the drive tube 14 such that the lever is operated when the end of the drive tube 14 overtravels the position of the limit switch 40. The other limit switch 41 is operated by a striker 45 movably mounted in the support 42. By means of a spring 46 the striker 46 is biassed into a position in which this limit switch is not operated. This limit switch 41 disconnects the motor 12 from the power source if the striker 46 abuts against the stop 47 during retraction of the telescopic assembly. The stop 47 is fixed on the dirve tube 14.

The control unit shown in FIG. 1 is a pneumatic means, operating two not shown switch members. These switch members control the motor 12. The switch members are mechanically interlocked to each other. Such a control unit is described in the Swiss Pat. No. 590 548. The limit switches 40, 41 and the switch members are not accessible from outside because the control means 4 is completely disposed within the inner tube 1, whereby a disturbance of the operation by external effects is prevented The described telescopic assembly is substantially useful as leg(s) of furniture, the height of which can be adjusted. Control unit 9 can be mounted onto said furniture.

While there is shown and described a present preferred embodiment of the invention, it is to be understood that the invention is not limited thereto, but may be otherwise variously embodied and practiced within the scope of the following claims.

I claim:

1. A telescopic assembly comprising
   an inner tube substantially closed at one end and open at the other end,
   an outer tube substantially closed at one end and open at the other end, said outer tube being movably disposed onto said inner tube,
   a motive power source having a rotatable hollow output shaft, said motive power source being disposed within said inner tube and affixed to the closed end thereof to prevent rotation therebetween,
   a screwed spindle affixed to said rotatable output shaft at one end, and
   a driving tube screwed onto said spindle at one end and affixed to said closed end of the outer tube, whereby rotation of said motor output shaft and said screwed spindle effects reciprocal displacement of said inner tube, said driving tube extends substantially into said hollow output shaft when retracted so that the minimum height of the assembly as well as the length of stroke correspond substantially to the length of said motive power source.

2. The telescopic assembly of claim 1, wherein said motive power source including a stator having ball bearings and a rotor having a hollow shaft supported in said ball bearings, said screwed spindle is affixed on said hollow shaft in cantilevered manner and extends through said hollow shaft, at least said stator is rigidly fixed to said inner tube.

3. The telescopic assembly of claim 1, wherein said driving tube is provided with a screwed sleeve at the other end, whereby rotation of said motive power source effects reciprocal displacement of said driving tube.

4. The telescopic assembly of claim 1, further comprising means for controlling said motive power source, said control means is disposed within said inner tube and includes at least two limit switches operable by said driving tube for disconnecting said motive power source to control the extension and retraction of said inner tube.

5. The telescopic assembly of claim 1, further comprising guide members adapted to guide said inner and outer tube, said guide member including a pin and a button shaped portion having a convex surface adapted for lumped bearing of the respective inner tube and outer tube, respectively, said guide members are uniformly divided around the periphery of said inner tube and outer tube, respectively.

6. The telescopic assembly of claim 5, further comprising elastical means adapted to urge said guide members against the respective inner and outer tube.

7. The telescopic assembly of claim 1, wherein said inner and outer tube have profiles cooperating together, said inner tube has a profile such that a channel-like compartment is formed between the shell of the motive power source and the inner cross section of said inner tube, which compartment extends substantially over the entire length of the motive power source.

8. The telescopic assembly of claim 7, wherein a gas pressure means is provided within said channel-like compartment, said gas pressure means is connected to said inner and outer tube and is adapted to assist the motive power source during extension of the assembly.

9. The telescopic assembly of claim 7, wherein inner and outer tube have a rectangular cross section.

10. The telescopic assembly of claim 7, wherein the inner and outer tube have a circular cross section, said motive power source is arranged such that the inner and outer tube are rotatable to each other.

11. The telescopic assembly of claim 1, further comprising a breaking means mounted on the output shaft of the motive power source.

12. The telescopic assembly of claim 1, further comprising a measuring arrangement adapted to reflect the relative position of said inner tube and of said outer tube, said arrangement is connected with a means for controlling said motive power source.

13. In combination with furniture, a telescopic assembly comprising
    an inner tube open at one end and closed at the other end by a mounting plate mounted on the lower side of said furniture,
    an outer tube open at one end and closed at the other end by a mounting plate adapted to rest on a floor or the like,
    a motive power source having a rotatable hollow output shaft, said motive power source being disposed within said inner tube and affixed to said mounting plate,
    a screwed spindle affixed to said rotatable output shaft, and
    a driving tube screwed onto said spindle at one end and affixed to said mounting plate of said outer tube, whereby rotation of said motor output shaft and said screwed spindle effects an adjustment of the level of said furniture by means of the reciprocal displacement of the inner and outer tube.

14. The combination of claim 13, further comprising means for connecting said motive power source to external means selected from the group consisting of an external power source, a control unit adapted to control the adjustment of the level of said furniture, and the combination thereof.

15. The combination of claim 14, wherein said control unit is mounted onto said furniture.

* * * * *